No. 732,266. PATENTED JUNE 30, 1903.
M. P. BOSS.
METALLURGICAL FURNACE.
APPLICATION FILED MAR. 26, 1902.
NO MODEL.
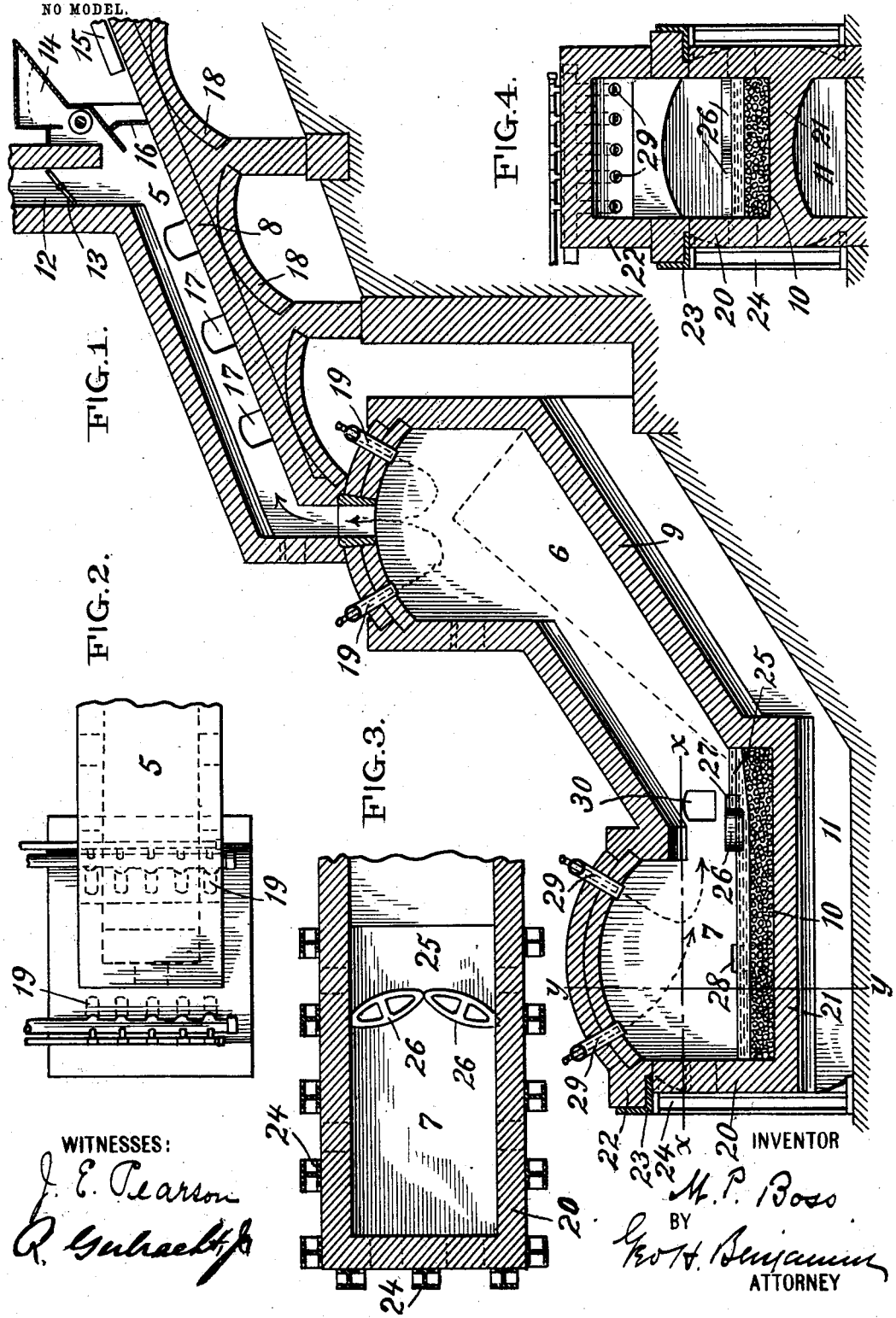
WITNESSES:
J. E. Pearson
R. Gulsaett Jr.
INVENTOR
M. P. Boss
BY
Geo. H. Benjamin
ATTORNEY No. 732,266.

Patented June 30, 1903.

UNITED STATES PATENT OFFICE.

MARTIN PRIOR BOSS, OF SAN FRANCISCO, CALIFORNIA, ASSIGNOR TO THE HYDRO-CARBON SMELTING COMPANY, A CORPORATION OF WEST VIRGINIA.

METALLURGICAL FURNACE.

SPECIFICATION forming part of Letters Patent No. 732,266, dated June 30, 1903.

Application filed March 26, 1902. Serial No. 100,017. (No model.)

*To all whom it may concern:*

Be it known that I, MARTIN PRIOR BOSS, a citizen of the United States, residing at San Francisco, county of San Francisco, State of California, have invented certain new and useful Improvements in Metallurgical Furnaces, of which the following is a specification.

My invention relates to metallurgical furnaces designed to carry into effect all of the operations necessary to convert an ore into pig metal.

My invention is especially applicable for the reduction of copper ores.

The general object of my invention is a construction of furnace in which a continuous process for the reduction of the ore may be carried out, thereby decreasing the time required to reduce the ore, as also the cost of handling, fuel, &c.

In the furnace described in the accompanying specification the ore is primarily subjected to a gradually-increasing temperature, then fed into a reducing-chamber, where it is subjected to a gradually-increasing temperature and acted upon to separate the metal, as far as is practicable in such a furnace, from the accompanying substances, then fed into an oxidizing-chamber of considerable length, where it is subjected to a high temperature, and finally fluxed to separate the metal from the accompanying substances.

The particular feature of invention of the accompanying specification consists in the construction of the oxidizing-chamber and the arrangement of the burners, through which artificial fuel is introduced into the furnace, as also to the employment of a floating slag-bridge.

The accompanying drawings will serve to illustrate my invention, and in which similar numerals indicate like parts.

Figure 1 is a vertical section of the furnace. Fig. 2 is a plan view of the top of the calcining-chamber and reducing-chamber, showing the position of the hydrocarbon-burners. Fig. 3 is a horizontal section of the oxidizing-chamber on the line X X of Fig. 1 and illustrating the position of the floating bridges. Fig. 4 is a vertical section of the oxidizing-chamber on the line Y Y of Fig. 1.

The furnace as a whole consists of three chambers—5, calcining-chamber; 6, reducing-chamber, and 7 oxidizing-chamber. The calcining and reducing chambers are provided with inclined hearths 8 9, while the oxidizing-chamber is provided with a horizontal hearth 10. Located over the horizontal hearth of the oxidizing-chamber is a bed, which forms the bottom of the chamber, which may be composed of ore, pig metal, or either of these bodies combined with some fluxing metal—such, for instance, as dolomite. Under the oxidizing and reducing chambers is arranged a cave 11 for cooling the bottom of these chambers.

The calcining-chamber 5 is provided at its upper end with an exit-flue 12, in which is a damper 13. Connected also to this chamber, at its upper end, is a feed-hopper 14, and under the feed-hopper there is indicated a mechanical rake 15, which is adapted to be horizontally moved forward and backward past the swinging door 16 for the purpose of pushing the ore discharged on the hearth 8 of the chamber 5 forward along the chamber. The calcining-chamber 5 is also provided with the lateral doors 17, through which a rake may be introduced for the purpose of aiding the ore in its progress down the incline of the hearths toward the reducing-chamber. The calcining-chamber is supported on arches 18.

The reducing-chamber 6 is provided with an arched roof and this chamber has considerable vertical height. The object of giving this chamber considerable vertical height is for the purpose of permitting free expansion of flame from the hydrocarbon gases introduced through the burners 19 in the top of the furnace. These burners, of which there are a number on each side, as shown in Fig. 2, are arranged to discharge hydrocarbon gases toward each other and downward into the reducing-chamber. By reason of this arrangement a body of flame is produced which curls downward, as indicated by the dotted lines and arrows, and then upward, the products of combustion passing through the calcining-chamber to the flue 12.

The oxidizing-chamber may be divided into two portions—20, the bottom portion and which is supported upon an arch 21, Fig. 4, which forms the top of the cave 11, and the top portion 22, which is supported independently of the bottom portion upon the angle-iron ring 23, supported upon the pillows 24. I make use of this construction in order that the crown of the furnace may contract and expand independently of the bed. It will be observed that the bottom portion 20 of the furnace forms a basin of considerable depth (thirty to forty inches) and is somewhat longer than the crown of the furnace and that the bottom of the furnace projects into the lower part of the reducing-chamber. I purposely make use of this construction in order to form a slag-basin 25 and permit vertical fining of the metal in its passage through the chamber. In order to prevent the slag from moving toward the front of the furnace, I make use of the floating bridges 26. (Shown in Fig. 3.) These bridges can be made of clay or other suitable material and float in the slag.

27 represents slag-doors through which the slag may be drawn from the furnace; 28, a door through which the refined metal may be drawn from the furnace.

Arranged in the top of the oxidizing-furnace are the hydrocarbon-burners 29, which correspond to the burners 19 in the reducing-chamber. The flames from these burners follow the course indicated by the arrows and pass through the reducing-chamber 6 on their way to the flue 12.

It will be observed that the vertical height of the roof of the oxidizing-chamber above the bed is not as great as that of the roof of the reducing-chamber above its bed. I make use of this construction in order to bring the developed flame nearer to the material upon the hearth, which in practice will be found to be of advantage, as a higher temperature is required in the oxidizing-chamber than in the reducing-chamber.

30 represents a door through which access may be had to the interior of the furnace, near the bridge, and through which, if desired, air may be allowed to enter to supply air for combustion of the combustible materials contained in the ore under treatment in the reducing-chamber. The floating bridges may also be introduced or withdrawn through this door for inspection and repair. Other doors may be provided in the sides of the furnace for similar purposes.

By making the bed of the oxidizing-chamber long, as illustrated, the ore under treatment is subjected to what may be termed a "refining process" from the time it is delivered upon the bed until it leaves the furnace. In practice it will be found that as the ore refines it takes upon itself a vertical movement along the bed, constantly rising and falling and increasing in specific gravity until the discharge-door is reached. It is assumed that this vertical movement is due to the fact that as the ore breaks up into metal and slag the metal drops. As the metal comes in contact with the bed it again picks up slag from the bed, which causes it to rise and give place to other metal falling. This process is continued until the metal reaches the front end of the bed, from which all of the slag has been removed by the refining process. I do not assert that this is the true reason, but merely give it as a possible explanation of the vertical movement of the metal which takes place in refining. That such vertical movement does take place is evidenced by the fact that at about the center of the furnace the specific gravity of the fluid body within the oxidizing-chamber will be slightly greater at the surface of the body than at the point where the fluid body is in contact with the bed upon the hearth.

I have made the above explanation in order that the extent of my invention may be understood, as I do not wish to limit myself to the details of construction of the furnace as shown, but wish to have it understood that I consider myself to be the first to describe a furnace construction within which vertical refining of the metal may take place.

Having thus described my invention, I claim—

1. A metallurgical furnace comprising in its construction, a calcining-chamber having an inclined hearth, a reducing-chamber connected to the lower end of the calcining-chamber, having an inclined hearth, and its interior at its upper end of considerable vertical height, an oxidizing-chamber having its bed or hearth extended backward into and connected with the hearth of the reducing-chamber, and means for producing the required atmospheres in said chambers.

2. In a metallurgical furnace, the combination of a reducing-chamber having an inclined hearth, an oxidizing-chamber having a horizontal hearth or bed which extends into the reducing-chamber, a slag-dam in said oxidizing-chamber, and means for producing the required atmospheres in said chambers.

3. In a metallurgical furnace, an oxidizing-chamber provided with a horizontal hearth or bed, which extends beyond the top of the chamber, a slag-dam in said chamber, slag-doors communicating with the hearth and also situated beyond the crown of the chamber, and means for creating an oxidizing atmosphere in said chamber.

4. In a metallurgical furnace, an oxidizing-chamber provided with a horizontal hearth or bed, which extends beyond the top of the chamber, slag-doors situated above the hearth and beyond the crown of the chamber and a floating slag-dam in said chamber, and means for creating an oxidizing atmosphere in said chamber.

5. In a metallurgical furnace, an oxidizing-chamber provided with a hearth longer than the chamber, a bed of fusible material located on said hearth, and a slag-dam situated over said bed and in such position that the portion of the hearth which extends beyond the chamber will serve as a slag-basin.

6. In a metallurgical furnace, the combination of a reducing-chamber, an exit-flue connected to the reducing-chamber, an oxidizing-chamber connected to the reducing-chamber opposite to its point of connection with the exit-flue, and means for producing the required atmospheres in said chambers; said means consisting of hydrocarbon-burners arranged to project their flames downwardly into the chambers and toward each other, and to be turned toward the exit-flue without impinging upon the material within the chambers.

7. In a metallurgical furnace, the combination of a reducing-chamber having its upper part of considerable vertical height, with vertical side walls and perforated crown, and its lower part with its roof parallel with the hearth of the chamber, an oxidizing-chamber having its hearth or bed extended into the reducing-chamber, and a crown covering that portion of the hearth which is not extended into the reducing-chamber, and means for creating the required atmospheres in said chambers.

8. In a metallurgical furnace, an oxidizing-chamber provided with a horizontal hearth, a floating bridge which serves to divide the chamber at the surface of the molten metal therein into two parts, one part serving to form a slag-basin, and the other part a refining-basin, the said basins having the required vertical depth to allow vertical fining of the metal from its point of ingress into the chamber to its point of egress from the chamber, and means for producing an oxidizing atmosphere in said chamber.

9. In a metallurgical furnace, a calcining-chamber, a reducing-chamber having an inclined hearth, said chambers connected together in such manner that the calcining-chamber will discharge through the crown of the reducing-chamber, an oxidizing-chamber connected to the lower part of the reducing-chamber and having its hearth extended into the reducing-chamber, and means for creating the required atmospheres in said reducing and oxidizing chambers.

In testimony whereof I affix my signature in the presence of two witnesses.

MARTIN PRIOR BOSS.

Witnesses:
J. E. PEARSON,
C. E. STECHER.